United States Patent [19]
Takagi et al.

[11] Patent Number: 6,019,016
[45] Date of Patent: Feb. 1, 2000

[54] ACCELERATOR PEDAL DEVICE

[75] Inventors: Kunio Takagi; Hitoshi Takeuchi, both of Obu, Japan

[73] Assignee: Aisan Kogyo Kabushiki Kaisha, Obu, Japan

[21] Appl. No.: 09/116,462

[22] Filed: Jul. 16, 1998

[30] Foreign Application Priority Data

Aug. 21, 1997 [JP] Japan ................................. 9-224911

[51] Int. Cl.⁷ ............................. G05G 1/14; H01C 10/00; F02D 7/00
[52] U.S. Cl. ..................... 74/513; 200/61.89; 200/86.5; 338/153; 123/399
[58] Field of Search ............................. 74/512, 513, 514, 74/560; 200/61.89, 86.5; 338/153; 123/399, 357, 361, 494; 267/155

[56] References Cited

U.S. PATENT DOCUMENTS

| | | | |
|---|---|---|---|
| Re. 34,574 | 4/1994 | Imoehl | 123/399 |
| 4,528,590 | 7/1985 | Bisacquino et al. | 338/153 |
| 4,915,075 | 4/1990 | Brown | 123/399 |
| 4,958,607 | 9/1990 | Lundberg | 123/399 |
| 5,063,811 | 11/1991 | Smith et al. | 74/513 |
| 5,241,936 | 9/1993 | Byler et al. | 123/399 |
| 5,385,068 | 1/1995 | White et al. | 74/512 |
| 5,408,899 | 4/1995 | Stewart | 74/513 |
| 5,416,295 | 5/1995 | White et al. | 200/86.5 |
| 5,529,296 | 6/1996 | Kato et al. | 74/513 X |
| 5,768,946 | 6/1998 | Fromer et al. | 74/514 |

FOREIGN PATENT DOCUMENTS 9-52541 2/1997 Japan .

Primary Examiner—Vinh T. Luong
Attorney, Agent, or Firm—Nikaido, Marmelstein, Murray & Oram LLP

[57] ABSTRACT

An accelerator pedal device has a bracket having a pin, a pedal arm turnably supported by the bracket through the pin, a return spring arranged to surround the pin for biasing the pedal arm, and an accelerator-opening sensor mounted on the bracket. An engaging portion is disposed at the leading end of the pedal arm, a rotor of the accelerator-opening sensor and the engaging portion are associated through the crank mechanism. As a driver depresses the accelerator pedal, the pedal arm turns on the pin, by the action of the crank mechanism engaging with the engaging portion it the leading end of the pedal arm, the rotor of the accelerator-opening sensor is rotated, and a voltage signal according to the depression stroke is outputted from the accelerator-opening sensor.

4 Claims, 5 Drawing Sheets

ACCELERATOR PEDAL DEVICE

BACKGROUND OF THE INVENTION

1. Field of the Invention

The present invention relates to an accelerator pedal device for an automobile and, more particularly, to an accelerator-pedal device equipped with an accelerator-opening sensor for detecting the degree of opening of an accelerator.

2. Description of the Prior Art

As an accelerator pedal device for transmitting the degree of opening of an accelerator pedal not through a link such as a wire but electrically to a throttle valve, there is known in the prior art an accelerator pedal device (as referred in for example, Unexamined Published Japanese Patent Application No. 9-52541), for example, which is given such a structure that an accelerator-opening sensor is disposed in the vicinity of the accelerator pedal, to rotate the accelerator-opening sensor in accordance with the depression stroke of the pedal.

In the existing accelerator pedal device of this kind, the arm of the accelerator pedal is turnably supported on a bracket through a pin, around which a return spring is mounted, A rotating portion is borne on the bracket on the leading end side of the arm, whereas an accelerator-opening sensor is connected through a shaft to the trailing end of the rotating portion. To this rotating portion, moreover, there is attached a cable receiving portion, which is connected through a wire to the pedal arm, so that the rotating portion is rotated according to the depression stroke of the accelerator to output a signal indicating the accelerator-opening degree from the accelerator-opening sensor.

In this accelerator pedal device, however, the pedal arm and the rotating portion are connected through the wire. This makes it necessary to provide means for urging the rotating portion in a reverse direction from the depressing direction, and accordingly a return spring at the rotating portion in addition to the return spring mounted on the pin of the arm.

SUMMARY OF THE INVENTION

An objective of the invention is to provide an accelerator pedal device which can be made small-sized as a whole by reducing the number of parts and by simplifying the structure.

In order to achieve the above-specified objective, according to the invention, there is provided an accelerator pedal device comprising: a bracket; a pedal arm turnably supported on the bracket through a pin and having an accelerator pedal fixed at its trailing end; a return spring arranged to surround the pin for biasing the pedal in the reverse direction to the depressing direction; and an accelerator-opening sensor mounted on the bracket for generating a signal indicating an accelerator-opening in accordance with the rotational angle of a rotor mounted therein. An engaging portion is disposed at the leading end of the pedal arm, and the rotor of the accelerator-opening sensor and the engaging portion are connected via a crank mechanism.

Here, the crank mechanism can be constructed by attaching a crank arm to the axial end of the rotor and by disposing a crank pin at the leading end of the crank arm, such that the crank pin engages with the engaging portion at the leading end of the pedal arm. Moreover, the engaging portion can be formed by fixing a band on the leading end of the pedal arm, and by forming a slot-shaped space for holding the crank pin between the band and the leading end of the arm.

With the accelerator pedal device thus constructed, as the driver depresses the accelerator pedal, the pedal arm turns on the pin against the biasing force of the return spring, and the rotor of the accelerator-opening sensor is rotated by the angle that corresponds to the depression stroke of the accelerator pedal by the action of the crank mechanism engaging with the engaging portion at the leading end of the pedal arm. In this way, a voltage signal according to the depression stroke is outputted from the accelerator-opening sensor. When the driver releases the accelerator pedal, on the other hand, the pedal arm is turned in the reverse direction to the depressing direction on the pin by the biasing force of the return spring, and the rotor of the accelerator-opening sensor is turned as described above so that a signal corresponding to the rotational angle is outputted.

Thus, the engaging portion, as disposed at the leading end of the pedal arm, and the rotor of the accelerator-opening sensor, are associated through the crank mechanism so that the rotor of the sensor is rotated according to the inclination of the pedal arm. As compared with the device of the prior art, the rotating portion and the cable receiving portion, as connected directly to the sensor, can be eliminated to reduce the size of the device. Moreover, the return spring or the cable, as disposed at the rotating portion, can be omitted to enable a drastic reduction of the number of parts required.

DESCRIPTION OF THE PREFERRED EMBODIMENT

Figure 1:
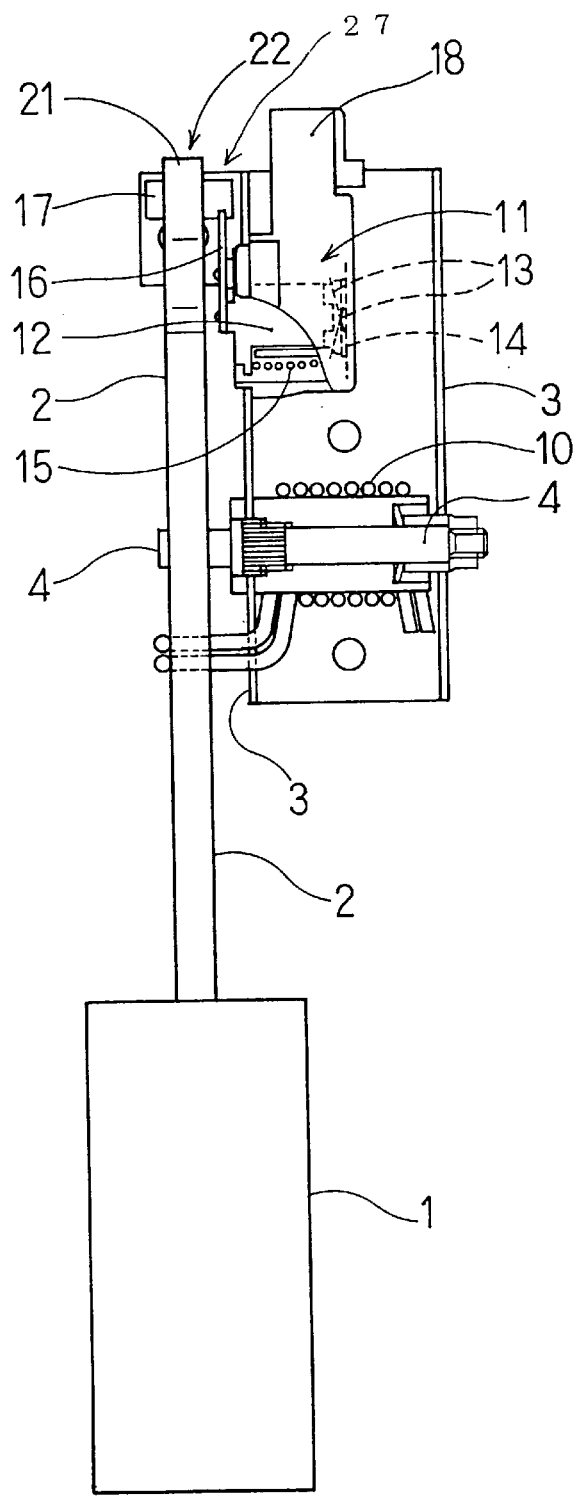
FIG. 1 is a front elevation showing an accelerator pedal device according to one mode of embodiment of the invention.
Figure 2:
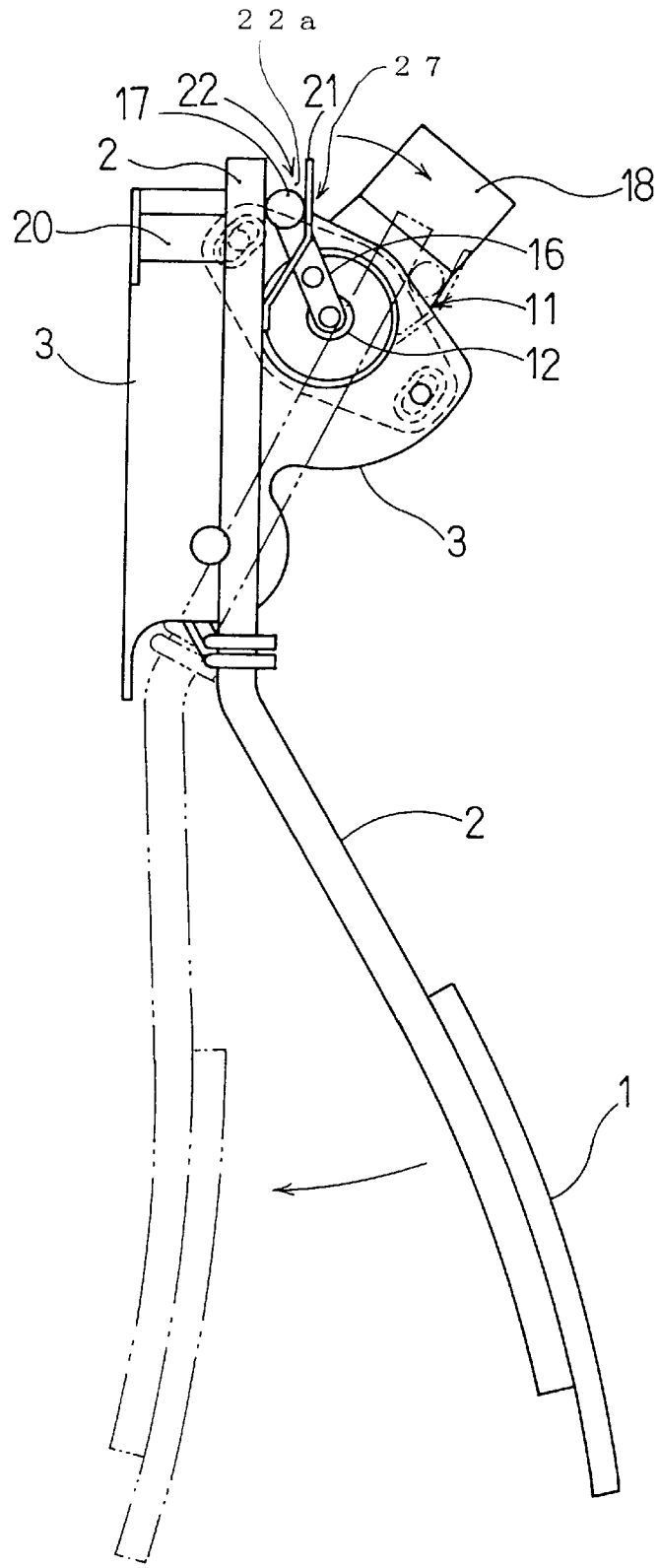
FIG. 2 is a lefthand side elevation of the same accelerator pedal device.
Figure 3:
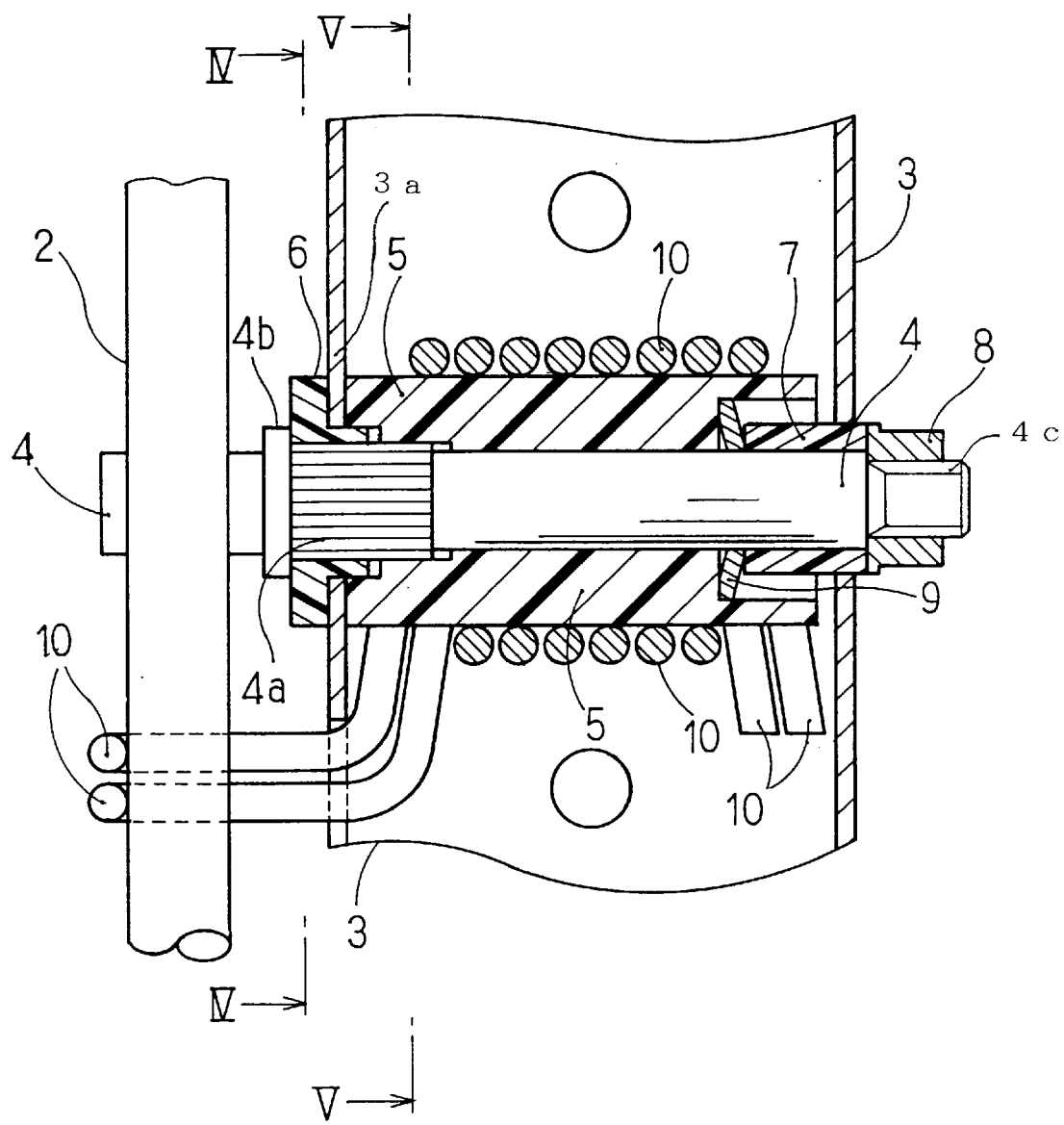
FIG. 3 is an enlarged section of a pin portion.

A mode of embodiment of the invention will be described with reference to the accompanying drawings. FIG. 1 is a front elevation of an accelerator pedal device; FIG. 2 is a lefthand side elevation of the device; and FIG. 3 is an enlarged section of a portion of FIG. 1. The accelerator pedal device is basically constructed to include: a bracket 3; a pedal arm 2 supported by the bracket 3 through a pin 4; an accelerator pedal 1 fixed on the trailing end 2b of the pedal arm 2; and an accelerator-opening sensor 11 attached to the bracket 3.

The pin 4, as fixed at a right angle on the intermediate portion of the pedal arm 2, is formed by threading the leading end externally at 4c, by serrating the intermediate portion at 4a on the side of the arm 2, and by flanging the end portion of the serrated portion 4a, as shown in FIG. 3. A bushing 6 made of a plastic is so press-fitted on the serrated portion 4a that its end portion abuts the flanged portion 4b.

The bracket 3 is formed into a C-shaped section by folding the two sides at a right angle at the forward side to form side wall portions. In these two side wall portions, there are formed holes which are each given a slightly larger diameter than that of the diametrically smaller portion of the bushing 6 so as to insert the pin 4 thereinto. This pin 4 is inserted from the outside into these holes so that the radially smaller portion of the bushing 6 enters the hole of the bracket 3. As this time, a cylindrical shaft 5 made of a plastic is positioned coaxially in the bracket 3, and the pin 4 is inserted into the cylindrical shaft 5 so that the externally threaded portion at the leading end of the pin 4 protrudes from the hole in the righthand side wall of the bracket 3. Around the cylindrical shaft 5, there is mounted a return spring 10 which is made of a coil spring.

The cylindrical shaft 5 has an axial bore 5a (having an internal diameter substantially equal to that of the bushing 6) for inserting the pin 4 thereinto. This axial bore 5a has a portion for fitting the diametrically smaller portion of the bushing 6 at its lefthand end portion, and a diametrically larger bore portion for inserting a spring seat 9 and a sleeve 7, as will be described hereinafter, at its righthand end. The serrated portion 4a of the pin 4 is press-fitted in a similar manner to the bushing 6 in the cylindrical shaft 5.

Figure 4:
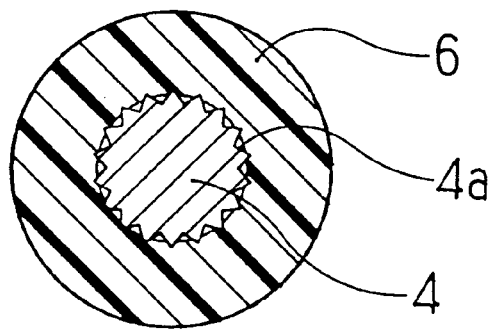
FIG. 4 is a section taken along line IV—IV of FIG. 3.
Figure 5:
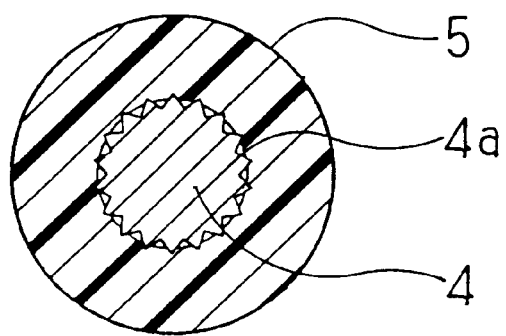
FIG. 5 is a section taken along line V—V of FIG. 3.

The shaft 4, around which the spring seat 9 is mounted, is arranged in the diametrically larger bore portion of the cylindrical shaft 5. Moreover, the sleeve 7 is inserted from the leading end side of the pin 4, and a nut 8 is fastened on the externally threaded portion 4c of the leading end of the pin 4 to mount the cylindrical shaft 5 and the bushing 6 in order to clamp the side wall 3a of the bracket 3 through the sleeve 7 and the spring seat 9. The spring seat 9 can be exemplified by a compression coil spring. As shown in FIGS. 4 and 5, the bushing 6, and the cylindrical shaft 5 are mounted to mesh with the serrated portion 4a of the pin 4 so that the pin 4, the bushing 6 and the cylindrical shaft 5 turn all together.

As a result, the clamping force of the side wall 3a by the bushing 6 and the cylindrical shaft 5 can be adjusted in correspondence with the fastening stroke of the nut 8 in order to adjust the turning resistance to the pin 4. By this adjustment of the turning resistance by the nut 8, the depression rate or the return rate of the accelerator pedal can be adjusted to a proper value. The leading end of the pin 4 is turnably supported by the side wall of the bracket 3 through the sleeve 7. The righthand end of the return spring 10 rests on the bracket 3, and the lefthand end of the return spring 10 abuts the back side of the pedal arm 2 on the side closer to the pedal than the pin 4, so that the accelerator pedal 1 is biased in its returning direction by the return spring 10.

The accelerator-opening sensor 11 is fixed on the lefthand side wall at the upper portion of the bracket 3 by means of screws 28. A rotor 12 is rotatably arranged at the central portion of the accelerator opening sensor 11. A brush 13 is fixed on the inner end portion of the rotor 12. On the inner wall facing the brush 13, there is mounted a sliding resistor 14 which has an electrical resistance. The brush 13 is in contact with the sliding resistor 14. The lefthand end portion of the rotor 12 is protruded towards the pedal arm from the hole formed in the side wall of the bracket 3. At the lefthand end side portion 11a of the sensor 11, there is disposed a crank mechanism 27 which employs the rotor 12 as its crankshaft. Specifically, a crank arm 16 is fixed at a right angle on the end portion of the rotor 12, a crank pin 17 is attached in parallel with the rotor axis to the leading end of the crank arm 16, so that the rotor 12 is rotated by moving the crank pin 17 back and forth of the plane shown in FIG. 1 through an angle α as shown in FIG. 2.

At the leading end 2a portion of the pedal arm 2, on the other hand, there is formed an engaging portion 22 which engages with the crank pin 17. The engaging portion 22 is formed by fixing a band 21 on the leading end 2a of the pedal arm 2, such that the crank pin 17 may be inserted and held with a clearance in a slot-shaped space 22a which is formed between the leading end 2a of the arm 2 and the band 21. The engaging portion 22 may be formed into a complete slot, but may also be given such a simple structure so as to hold the crank pin 17 only longitudinally, as in this embodiment, by fixing the band 21 on the leading end 2a of the arm 2 and by opening the leading end side.

When the pedal arm 2 is inclined, the rotor 12 of the accelerator-opening sensor 11 is rotated according to the depression stroke of the pedal arm 2 by the action of the crank mechanism 27. To the bracket 3 at the back of the engaging portion 22 there is attached a stopper 20 which is made of a synthetic resin, so that the pedal arm 2 is stopped, when inactive, by abutting at its leading end the stopper 20.

The engaging portion 22 to engage with the crank pin 17 of the crank mechanism 27 is required to have a small clearance around the pin, because this crank pin 17 moves within the engaging portion 22 when active. If a return spring 15 fitted in the accelerator-opening sensor 11 is broken, it is therefore anticipated (as illustrated in FIG. 6) that the output of the accelerator-opening sensor 11 will fail to respond, even if only for a short time period, at the initial instant when the accelerator pedal 1 is depressed, and that the rotor 12 of the accelerator-opening sensor 11 will not be able to completely return to the initial position (or to the idle position), even when the accelerator pedal 1 is released.

Figure 6:
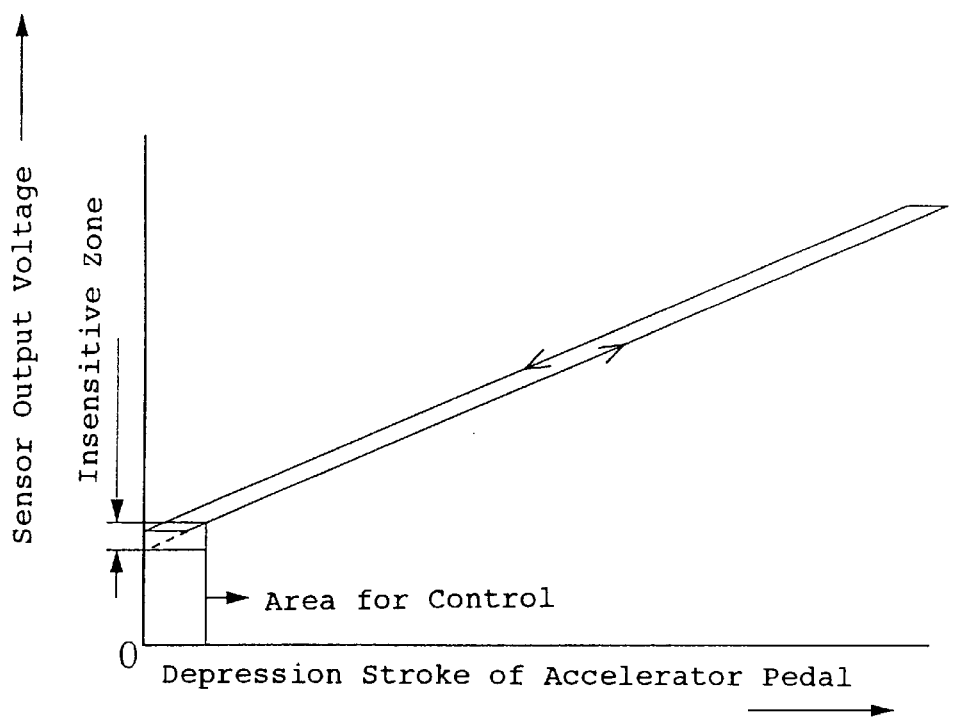
FIG. 6 is a graph illustrating the relation between a depression stroke and a sensor output voltage.

To resolve this difficulty, a control processor circuit (such as a microcomputer) for processing the output signal of the accelerator-opening sensor 11 may be established (as illustrated in FIG. 6) with an insensitive zone such that no inputting operation is performed when the sensor output voltage at the initial stage of the depression of the accelerator pedal 1 is at a predetermined level or less, as well as with a control region after the insensitive zone. By setting this insensitive zone, the control system for transmitting the information regarding the accelerator-opening is not adversely affected even if the return spring 15 of the accelerator-opening sensor 11 is broken.

The accelerator pedal device thus configured is mounted as in an ordinary automobile by fixing the bracket 3 under the driver's seat of the compartment by means of fastening screws or the like. A connector portion 18 of the accelerator-opening sensor 11 is connected through electric connection lines with the control processor, and a throttle valve driving device is connected with the output side of the control processor.

As the driver depresses the accelerator pedal 1, the pedal arm 2 is turned together with the pin 4 against the biasing force of the return spring 10. At this time, the leading end 2a of the pedal arm 2 is inclined in the direction opposed to the depressing direction of the pedal, that is, towards the viewer's direction (i.e., the forward side) of FIG. 1 so that the rotor 12 acting as the crankshaft is rotated clockwise in the plane of FIG. 2 by the actions of the crank pin 17 and the crank arm 16 engaging with the engaging portion 22 at the leading end. The rotor 12 of the accelerator-opening sensor 11 is rotated to an angle a corresponding to the depression stroke of the accelerator pedal 1, and the brush 13 mounted on the rotor 12 slides on the sliding resistor 14. As a result, the electric signal according to the depression stroke is outputted from the accelerator-opening sensor 11 so that the sensor output signal is employed to control the drive of the throttle valve.

Conversely, when the driver releases the accelerator pedal 1, the pedal arm 2 is turned in the reverse direction of the depressing direction on the pin 4 by the biasing force of the return spring 10. At this time, the rotor 12 acting as the crankshaft is rotated by the actions of the crank pin 17 and the crank arm 16 engaging with the engaging portion 22 at the leading end 2a of the pedal arm 2. This rotor 12 of the accelerator-opening sensor 11 is rotated to an angle a corresponding to the return stroke of the accelerator pedal 1, and the brush 13 mounted on the rotor 12 slides on the sliding resistor 14. As a result, the voltage signal that corresponds to the return stroke is outputted from the accelerator-opening sensor 11.

Thus, the return spring 10 is mounted to surround the pin 4 of the pedal arm 2, and the engaging portion 22, as disposed at the leading end 2a of the pedal arm 2, is associated with the rotor 12 of the accelerator opening sensor 11 through the crank mechanism 27. As a result, the configuration of the accelerator pedal device can be made simpler than that of the prior art so that the accelerator pedal device can be activated with the single return spring 10.

What is claimed is:

1. An accelerator pedal device comprising:
   (a) a bracket having a pin;
   (b) a pedal arm turnably supported by said bracket through said pin, and having an accelerator pedal fixed on its trailing end;
   (c) a return spring to surround around said pin for biasing said pedal arm in the reverse direction of a depressing direction;
   (d) an accelerator-opening sensor mounted on said bracket for generating a signal indicating an accelerator-opening in accordance with a rotational angle of a rotor mounted therein;
   (e) a crank mechanism employing the rotor of said accelerator-opening sensor as a crankshaft, and arranged on the side portion of said accelerator-opening sensor; and
   (f) an engaging portion disposed at the leading end of said pedal arm for engaging said crank mechanism and the leading end of said pedal arm.

2. An accelerator pedal device according to claim 1, wherein said crank mechanism includes: a crank arm attached to the axial end of said rotor; and a crank pin attached to the leading end of said crank arm and engaging with said engaging portion at the leading end of said pedal arm.

3. An accelerator pedal device according to claims 1 or 2, wherein said engaging portion includes: a band fixed on the leading end of said pedal arm; and a slot-shaped space for holding said crank pin between said band and the leading end of said arm.

4. An accelerator pedal device according to claim 1, wherein said pin has a serrated portion, wherein a bushing and a cylindrical shaft are fitted on the outer circumference of said serrated portion so as to mesh with each other and to clamp the side wall of said bracket, and wherein a nut is fastened on an externally threaded portion formed at the leading end of said pin, so that the clamping force of said side wall by said cylindrical shaft and said bush is adjusted by said nut in order to adjust the turning resistance of said pin.

* * * * *